US011214922B2

(12) United States Patent
Higuchi (10) Patent No.: US 11,214,922 B2
(45) Date of Patent: Jan. 4, 2022

(54) FIBROUS MATERIAL ACCUMULATING APPARATUS AND SHEET MANUFACTURING APPARATUS

(71) Applicant: SEIKO EPSON CORPORATION, Tokyo (JP)

(72) Inventor: Naotaka Higuchi, Suwa-gun (JP)

(73) Assignee: SEIKO EPSON CORPORATION, Tokyo (JP)

(*) Notice: Subject to any disclaimer, the term of this patent is extended or adjusted under 35 U.S.C. 154(b) by 129 days.

(21) Appl. No.: 16/699,346

(22) Filed: Nov. 29, 2019

(65) Prior Publication Data

US 2020/0173105 A1 Jun. 4, 2020

(30) Foreign Application Priority Data

Nov. 30, 2018 (JP) .............................. JP2018-225994

(51) Int. Cl.
| | |
|---|---|
| *D21F 1/00* | (2006.01) |
| *D21F 9/00* | (2006.01) |
| *D04H 1/732* | (2012.01) |
| *D04H 1/736* | (2012.01) |
| *D21F 1/80* | (2006.01) |

(52) U.S. Cl.
CPC ........... *D21F 1/0018* (2013.01); *D04H 1/732* (2013.01); *D04H 1/736* (2013.01); *D21F 1/0027* (2013.01); *D21F 1/80* (2013.01); *D21F 9/00* (2013.01)

(58) Field of Classification Search
CPC . D21F 7/00; D21F 9/00; D21F 1/0018; D21F 1/80; D04H 1/72; D04H 1/736; D04H 1/732

See application file for complete search history.

(56) References Cited

U.S. PATENT DOCUMENTS

| | | | | |
|---|---|---|---|---|
| 3,016,582 | A | | 1/1962 | Joa |
| 3,886,629 | A | * | 6/1975 | Nakai ...................... D04H 1/72 425/83.1 |
| 3,984,898 | A | | 10/1976 | Matsumura et al. |
| 4,144,619 | A | * | 3/1979 | White .................... D01G 25/00 19/304 |
| 4,650,409 | A | * | 3/1987 | Nistri ..................... D04H 1/425 156/62.4 |
| 7,093,718 | B2 | | 8/2006 | Kato et al. |

(Continued)

FOREIGN PATENT DOCUMENTS

| | | |
|---|---|---|
| EP | 0159618 A1 | 10/1985 |
| JP | S48-36463 A | 5/1973 |

(Continued)

*Primary Examiner* — Eric Hug (74) *Attorney, Agent, or Firm* — Oliff PLC (57) ABSTRACT

A fibrous material accumulating apparatus includes a dispersing section which disperses a material containing fibers, a belt which accumulates the dispersed material, and a suction section provided on a side of the belt opposite to the dispersing section, in which the dispersing section includes a storage section including a screen, a supply section which supplies the material to the storage section, and a rotating body which is provided inside the storage section and agitates the material supplied into the storage section, and the storage section includes a communicating port which causes an inside and an outside of the storage section to communicate with each other and is provided at a different position from the screen.

11 Claims, 8 Drawing Sheets

(56) References Cited

U.S. PATENT DOCUMENTS

| | | | |
|---|---|---|---|
| 7,690,903 B2 | 4/2010 | Norgaard et al. | |
| 2008/0241301 A1* | 10/2008 | Norgaard | D04H 1/732 |
| | | | 425/145 |

FOREIGN PATENT DOCUMENTS

| | | |
|---|---|---|
| JP | S48-072474 A | 9/1973 |
| JP | S60-220173 A | 11/1985 |
| JP | S61-212344 A | 9/1986 |
| JP | H03-131372 A | 6/1991 |
| JP | H11-244784 A | 9/1999 |
| JP | 3492676 B2 | 2/2004 |
| JP | 2010-207749 A | 9/2010 |
| WO | 2005/106091 A1 | 11/2005 |

* cited by examiner

FIBROUS MATERIAL ACCUMULATING APPARATUS AND SHEET MANUFACTURING APPARATUS

The present application is based on, and claims priority from JP Application Serial Number 2018-225994, filed Nov. 30, 2018, the disclosure of which is hereby incorporated by reference herein in its entirety.

BACKGROUND

1. Technical Field

The present disclosure relates to a fibrous material accumulating apparatus and a sheet manufacturing apparatus.

2. Related Art

In a sheet manufacturing apparatus of the related art, a so-called wet system in which water is introduced to a feedstock containing fibers, defibration is performed using mainly mechanical action, and the result is re-spread into sheets. In such a wet system sheet manufacturing apparatus, a large amount of water is necessary and the apparatus becomes large. On top of servicing maintenance of a water processing facility being laborious, a large amount of energy is used on a drying process.

Therefore, there is proposed a dry system sheet manufacturing apparatus in which water usage is avoided as much as possible in order to reduce size and achieve low energy consumption. For example, JP-A-48-36463 discloses an apparatus which defibrates a feedstock using a dry system, causes the defibrated matter to accumulate, and shapes the defibrated matter into a sheet shape. In this apparatus, the accumulating section which causes the defibrated matter to accumulate includes a housing, a cylindrical screen, and a rotating body which rotates in an inside of the screen, the screen being provided inside the housing and configured by a porous body. The defibrated matter supplied to the inside of the screen passes through the screen while being untangled inside the screen by the rotation of the rotating body, is dispersed in a gas, and accumulates on a belt. Accordingly, a web is formed.

In the apparatus disclosed in JP-A-48-36463, the accumulation is performed while suctioning the inside of the housing using a suction section in order to promote the accumulation on the belt. Therefore, a ventilation port communicating the inside with the outside is provided in the housing and an air current heading from the ventilation port toward the suction section is formed.

However, in the apparatus disclosed in JP-A-48-36463, a configuration is adopted in which a ventilation port is provided in the housing and the accumulation is performed while supplying air to a space between the housing and the screen. Therefore, defibrated matter which passes through the screen and is dispersed may not accumulate at a desired position on the belt due to the influence of the air current. As a result, thickness irregularities may be generated in the web.

The present disclosure can be realized in the following aspects or application examples.

SUMMARY

According to an aspect of the present disclosure, there is provided a fibrous material accumulating apparatus which includes a dispersing section which disperses a material containing fibers, a belt which accumulates the dispersed material, and a suction section provided on a side of the belt opposite to the dispersing section, in which the dispersing section includes a storage section including a screen, a supply section which supplies the material to the storage section, and a rotating body which is provided inside the storage section and agitates the material supplied into the storage section, and the storage section includes a communicating port which causes an inside and an outside of the storage section to communicate with each other and is provided at a different position from the screen.

According to another aspect of the present disclosure, there is provided a sheet manufacturing apparatus including the fibrous material accumulating apparatus according to the present disclosure, and a shaping section which shapes a web formed by the fibrous material accumulating apparatus into a sheet shape.

DESCRIPTION OF EXEMPLARY EMBODIMENTS

Hereinafter, a detailed description will be given of a fibrous material accumulating apparatus and a sheet manufacturing apparatus of the present disclosure based on favorable embodiments which are illustrated in the attached drawings.

First Embodiment

Figure 1:
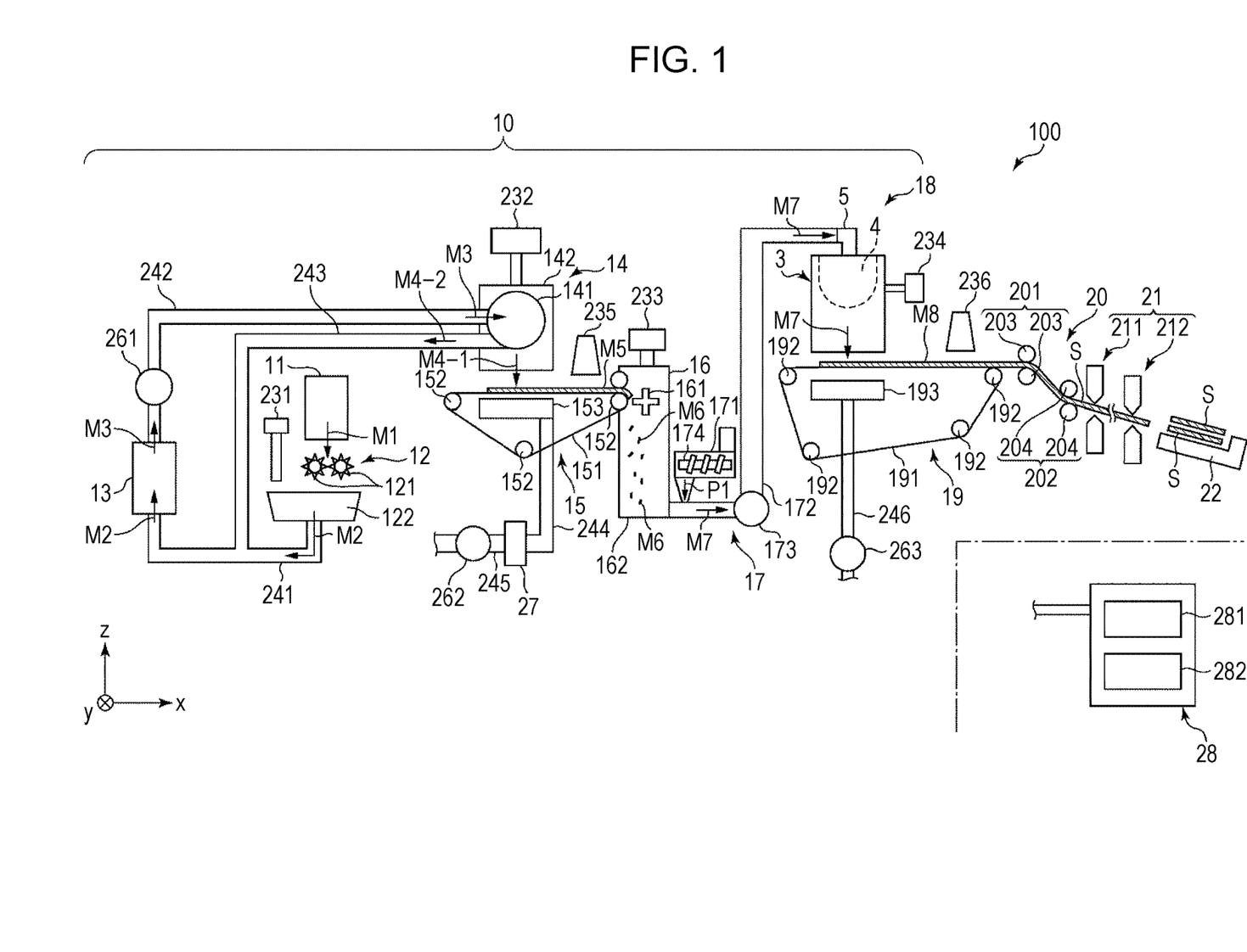
FIG. 1 is a schematic side view illustrating a first embodiment of a fibrous material accumulating apparatus and a sheet manufacturing apparatus of the present disclosure.
Figure 2:
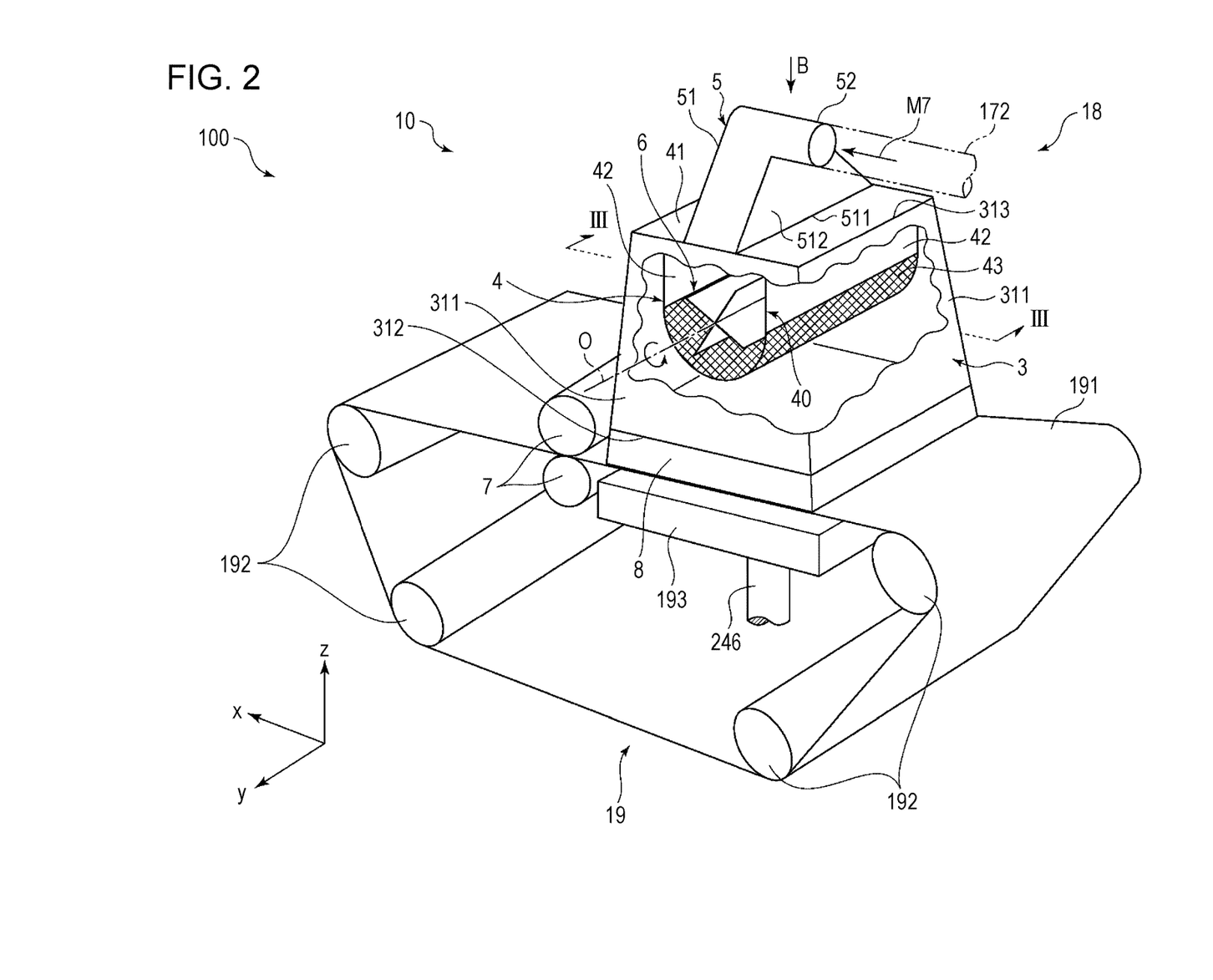
FIG. 2 is a perspective view illustrating a dispersing section and a second web forming section illustrated in FIG. 1.
Figure 3:
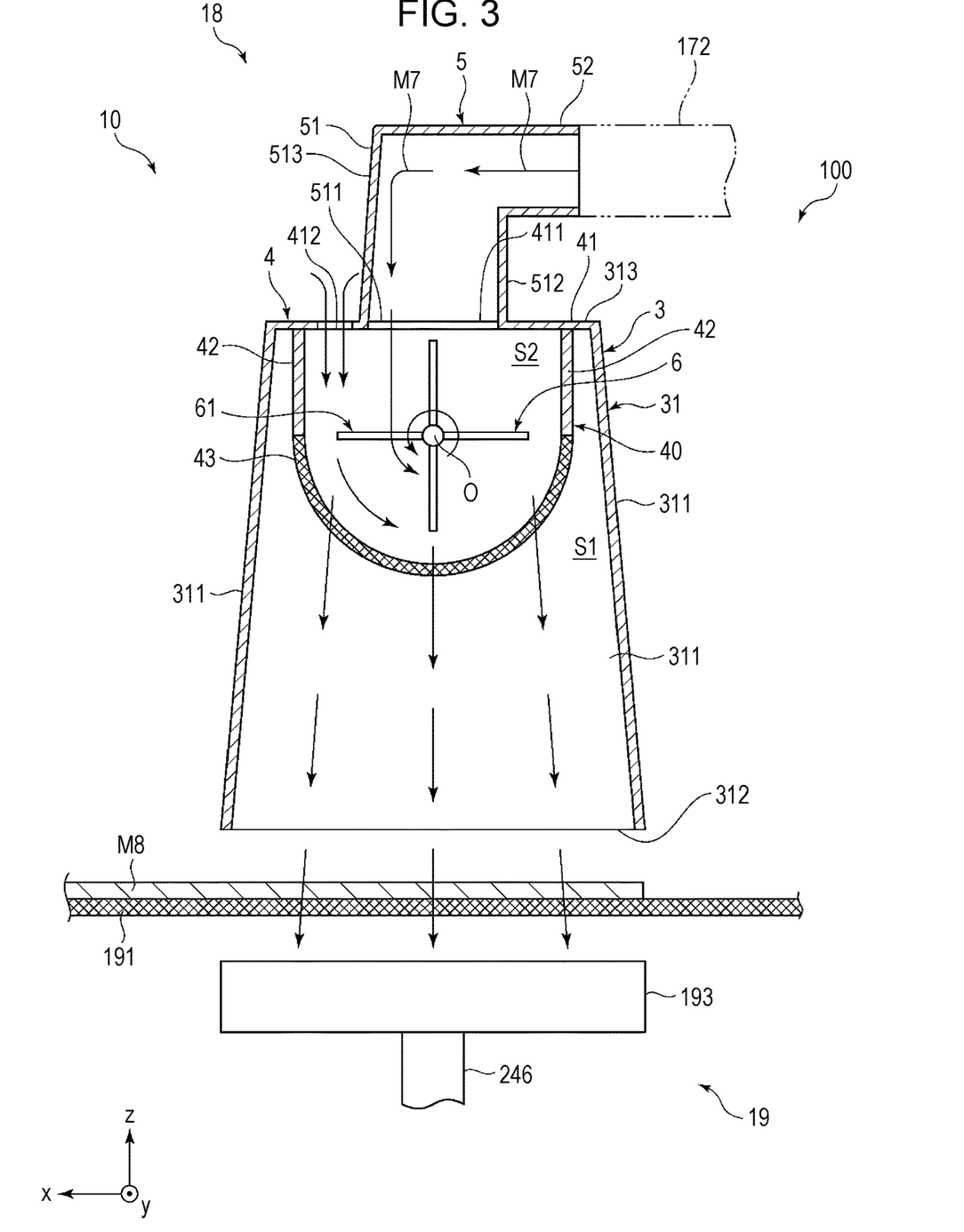
FIG. 3 is a sectional diagram taken along a line III-III in FIG. 2.
Figure 4:
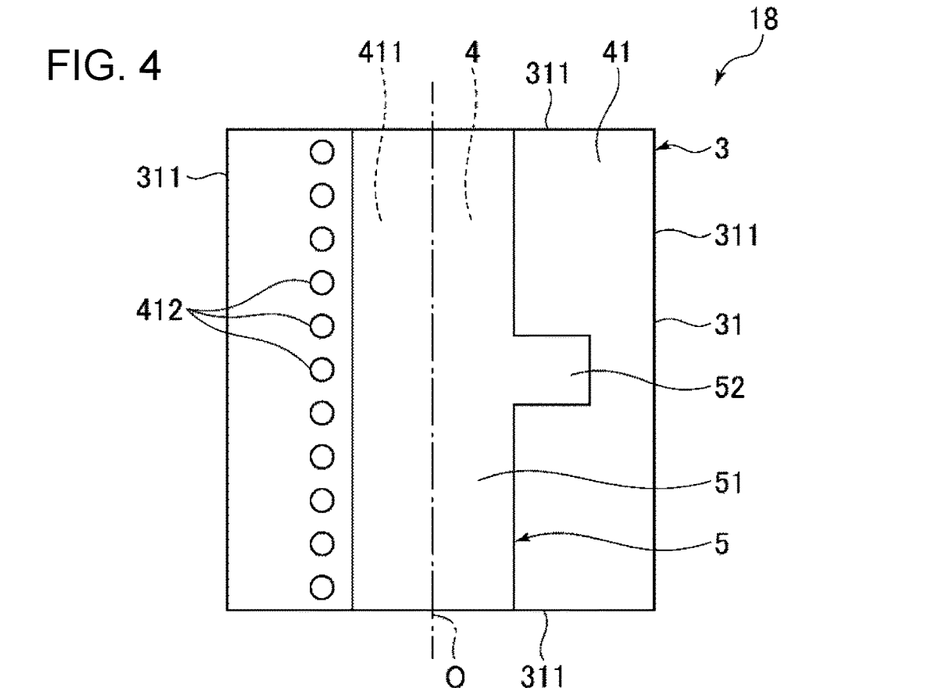
FIG. 4 is a view from an arrow B direction in FIG. 2.
Figure 9:
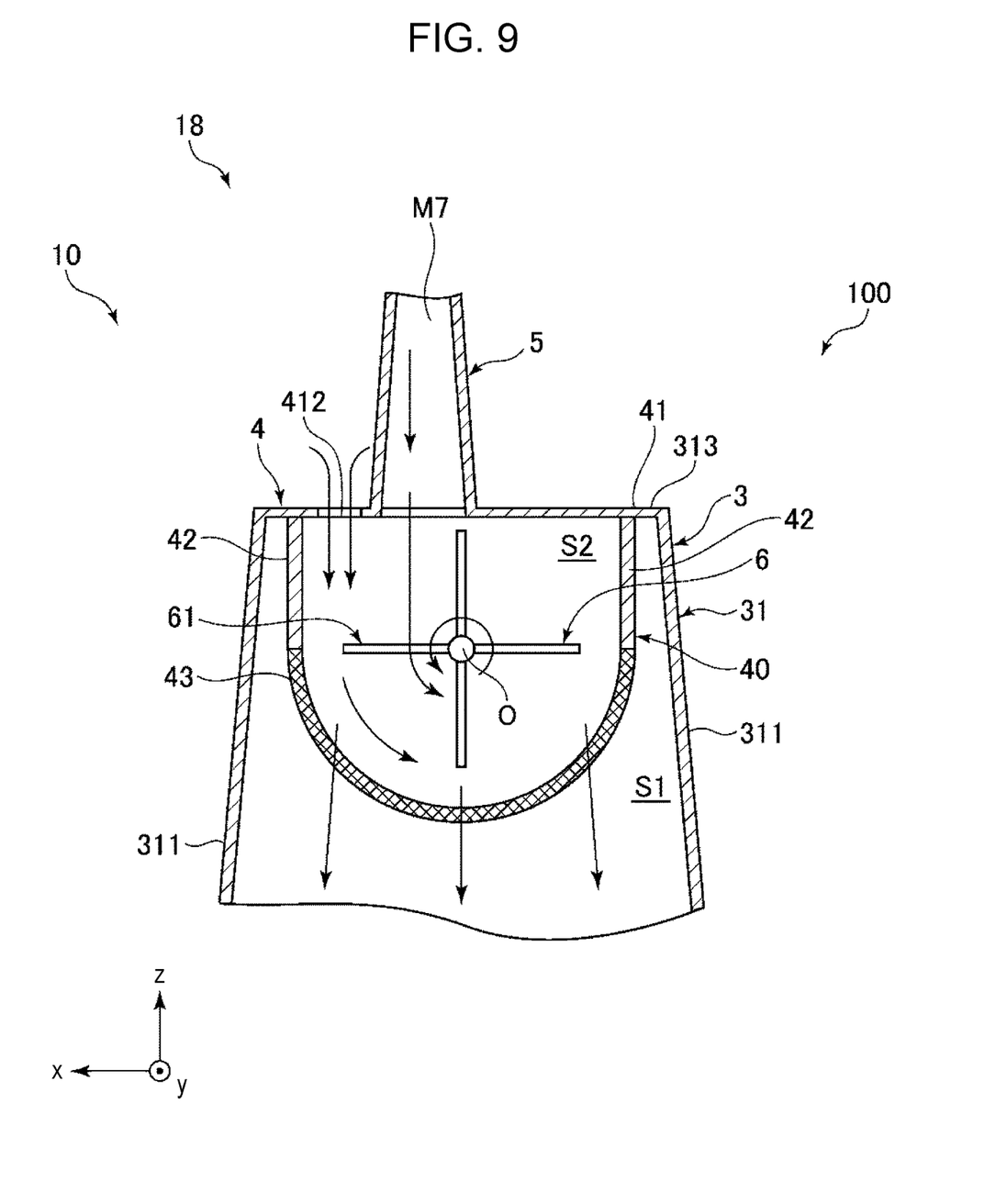
FIG. 9 is a sectional diagram illustrating a modification example of a dispersing section provided in a fibrous material accumulating apparatus of the present disclosure.

FIG. 1 is a schematic side view illustrating a first embodiment of a fibrous material accumulating apparatus and a sheet manufacturing apparatus of the present disclosure. FIG. 2 is a perspective view illustrating a dispersing section and a second web forming section illustrated in FIG. 1. FIG. 3 is a sectional diagram taken along a line III-III in FIG. 2. FIG. 4 is a view from an arrow B direction in FIG. 2. FIG. 9 is a sectional diagram illustrating a modification example of a dispersing section provided in a fibrous material accumulating apparatus of the present disclosure.

Hereinafter, to facilitate explanation, three axes orthogonally intersecting each other will be an x-axis, a y-axis, and a z-axis as illustrated in FIGS. 1 and 2. An xy plane including the x-axis and the y-axis is horizontal and the z-axis is vertical. The directions in which the arrows of each axis face will be referred to as "+" and the opposite directions will be referred to as "−". The top side of FIGS. 1 and 2 will be referred to as "the top" or "above", and the bottom side will be referred to as "the bottom" or "below". In FIG. 1, the left side may be referred to as "upstream" and the right side may be referred to as "downstream".

As illustrated in FIGS. 1 and 2, a sheet manufacturing apparatus 100 is provided with a fibrous material accumulating apparatus 10, a sheet shaping section 20, a cutting section 21, a stock section 22, and a collecting section 27. The fibrous material accumulating apparatus 10 is provided with a feedstock supply section 11, a crushing section 12, a defibrating section 13, a sorting section 14, a first web forming section 15, a subdividing section 16, a mixing section 17, a dispersing section 18, a second web forming section 19, and a control section 28.

As illustrated in FIGS. 1 and 2, the sheet manufacturing apparatus 100 is provided with a humidifying section 231, a humidifying section 232, a humidifying section 233, a humidifying section 234, a humidifying section 235, and a humidifying section 236. Additionally, the sheet manufacturing apparatus 100 is provided with a blower 173, a blower 261, a blower 262, and a blower 263.

In the sheet manufacturing apparatus 100, a feedstock supplying process, a crushing process, a defibrating process, a sorting process, a first web forming process, a dividing process, a mixing process, a dispersing process, a second web forming process, a sheet shaping process, and a cutting process are executed in this order.

Hereinafter, a description will be given of the configurations of each part.

As illustrated in FIG. 1, the feedstock supply section 11 is a portion which performs the feedstock supplying process of supplying a feedstock M1 to the crushing section 12. It is possible to use a sheet-like material formed from fiber-containing matter containing cellulose fibers for the feedstock M1. The cellulose fibers may have the compound cellulose as the main component and be fibrous, and may include, in addition to the cellulose, hemicellulose and lignin. The form of the feedstock M1, such as woven textiles and non-woven textiles, is unimportant. The feedstock M1 may be recycled paper which is manufactured by defibrating and recycling old paper, Yupo paper (registered trademark) which is synthetic paper, and may not be recycled paper. In the present embodiment, the feedstock M1 is old paper that is used or is no longer necessary.

The crushing section 12 is the portion which performs the crushing process of crushing the feedstock M1 supplied from the feedstock supply section 11 in a gas such as the atmosphere. The crushing section 12 includes a pair of crushing blades 121 and a chute 122.

The pair of crushing blades 121 is capable of crushing, that is, cutting the feedstock M1 between the crushing blades 121 by rotating in opposite directions from each other to form crushed pieces M2. The shape and size of the crushed pieces M2 are preferably suitable for the defibrating process in the defibrating section 13, for example, fragments in which the length of one side is less than or equal to 100 mm are preferable, and fragments in which the length of one side is 10 mm to 70 mm are more preferable.

The chute 122 is disposed below the pair of crushing blades 121 and is funnel shaped, for example. Accordingly, the chute 122 is capable of receiving the crushed pieces M2 which are crushed by the crushing blades 121 and fall down.

The humidifying section 231 is disposed adjacent to the pair of crushing blades 121 above the chute 122. The humidifying section 231 humidifies the crushed pieces M2 inside the chute 122. The humidifying section 231 is configured by a humidifier of a vaporizing system, in particular, a warm air vaporizing system which includes a filter (not illustrated) including a water content in which humidified air having a heightened humidity is supplied to the crushed pieces M2 by passing air through the filter. It is possible to suppress the adherence of the crushed pieces M2 to the chute 122 and the like due to static electricity by supplying the humidified air to the crushed pieces M2.

The chute 122 is connected to the defibrating section 13 via a tube 241. The crushed pieces M2 gathered in the chute 122 pass through the tube 241 and are transported to the defibrating section 13.

The defibrating section 13 is a portion which performs the defibrating process which defibrates the crushed pieces M2 in a gas, that is, in a dry system. It is possible to generate defibrated matter M3 from the crushed pieces M2 through the defibrating process of the defibrating section 13. Here, "to defibrate" refers to untangling the crushed pieces M2, each of which is formed by a plurality of fibers being bonded together, into individual fibers. The untangled result is the defibrated matter M3. The shape of the defibrated matter M3 is string-shaped or loop-shaped. The defibrated matter M3 may be present in a state of being tangled with each other to form lumps, that is, may be present in a state of forming so-called "clumps".

For example, in the present embodiment, the defibrating section 13 is configured by an impeller mill including a rotor which rotates at high speed and a liner positioned on the outer circumference of the rotor. The crushed pieces M2 which flow into the defibrating section 13 are interposed between the rotor and the liner and are defibrated.

The defibrating section 13 is capable of generating a flow of air, that is, an air current from the crushing section 12 toward the sorting section 14 through the rotation of the rotor. Accordingly, it is possible to suction the crushed pieces M2 from the tube 241 to the defibrating section 13. After the defibrating process, it is possible to pump out the defibrated matter M3 to the sorting section 14 via a tube 242.

The blower 261 is installed in the middle of the tube 242. The blower 261 is an air current generating device which generates an air current heading toward the sorting section 14. Accordingly, the pumping out of the defibrated matter M3 to the sorting section 14 is promoted.

The sorting section 14 is a portion which performs the sorting process of sorting defibrated matter M3 by magnitude of fiber length. In the sorting section 14, the defibrated matter M3 is sorted into first sorted matter M4-1 and second sorted matter M4-2 which has larger than those of the first sorted matter M4-1. The first sorted matter M4-1 has a size suitable for the subsequent manufacturing of the sheet S. It is preferable that the average length be 1 µm to 30 µm. Meanwhile, the second sorted matter M4-2 contains the defibrated fibers is insufficient, the defibrated fibers are excessively agglomerated to each other, and the like, for example.

The sorting section 14 includes a drum section 141 and a housing section 142 housing the drum section 141.

The drum section 141 is configured by a cylindrical mesh body and is a sieve which rotates around a center axis. The defibrated matter M3 flows into the drum section 141. Due to the rotation of the drum section 141, the defibrated matter M3 is smaller than the aperture of the mesh is sorted as the first sorted matter M4-1 and the defibrated matter M3 having a size greater than or equal to the aperture of the mesh is sorted as the second sorted matter M4-2.

The first sorted matter M4-1 falls from the drum section 141.

Meanwhile, the second sorted matter M4-2 is pumped out to a tube 243 connected to the drum section 141. The opposite side of the tube 243 from the drum section 141, that is, the upstream side is connected to the tube 241. The second sorted matter M4-2 which passes through the tube 243 flows to join the crushed pieces M2 inside the tube 241 and flows into the defibrating section 13 together with the crushed pieces M2. Accordingly, the second sorted matter M4-2 is returned to the defibrating section 13 and is subjected to the defibrating process together with the crushed pieces M2.

The first sorted matter M4-1 from the drum section 141 falls while being dispersed in a gas and heads for the first web forming section 15 positioned beneath the drum section 141. The first web forming section 15 is a portion which performs the first web forming process of forming a first web M5 from the first sorted matter M4-1. The first web forming section 15 includes a mesh belt 151, three stretch rollers 152, and a suction section 153.

The mesh belt 151 is an endless belt and the first sorted matter M4-1 accumulates thereon. The mesh belt 151 is wrapped around the three stretch rollers 152. The first sorted matter M4-1 on the mesh belt 151 is transported downstream by the rotational driving of the stretch rollers 152.

The first sorted matter M4-1 are of a size greater than or equal to the aperture of the mesh belt 151. Accordingly, the first sorted matter M4-1 is restricted from passing through the mesh belt 151, and thus, is capable of accumulating on the mesh belt 151. Since the first sorted matter M4-1 is transported downstream together with the mesh belt 151 while accumulating on the mesh belt 151, the first sorted matter M4-1 is formed as the layer-shaped first web M5.

There is a concern that dirt, dust, and the like may be mixed into the first sorted matter M4-1, for example. The dirt and dust may be generated by the crushing and the defibrating, for example. The dirt and dust are collected in the collecting section 27 (described later).

The suction section 153 is a suction mechanism which suctions the air from below the mesh belt 151. Accordingly, it is possible to suction the dirt and dust which pass through the mesh belt 151 together with the air.

The suction section 153 is connected to the collecting section 27 via a tube 244. The dirt and dust suctioned by the suction section 153 is collected in the collecting section 27.

A tube 245 is further connected to the collecting section 27. The blower 262 is installed in the middle of the tube 245. It is possible to generate an suction force in the suction section 153 using the operation of the blower 262. Accordingly, the formation of the first web M5 on the mesh belt 151 is promoted. The first web M5 has the dirt, dust, and the like removed. The dirt and dust pass through the tube 244 and reach the collecting section 27 due to the operation of the blower 262.

The housing section 142 is connected to the humidifying section 232. The humidifying section 232 is configured by a vaporizing humidifier similar to the humidifying section 231. Accordingly, the humidified air is supplied into the housing section 142. It is possible to humidify the first sorted matter M4-1 using the humidified air, and thus, it is possible to suppress the adherence of the first sorted matter M4-1 to the inner walls of the housing section 142 caused by static electricity.

The humidifying section 235 is disposed downstream of the sorting section 14. The humidifying section 235 is configured by an ultrasonic wave humidifier which sprays a mist of water. Accordingly, it is possible to supply water content to the first web M5, and thus, the water content amount of the first web M5 is adjusted. According to the adjustment, it is possible to suppress the adherence of the first web M5 to the mesh belt 151 caused by static electricity. Accordingly, the first web M5 is easily peeled from the mesh belt 151 at a position at which the mesh belt 151 doubles back at the stretch roller 152.

The subdividing section 16 is disposed downstream of the humidifying section 235. The subdividing section 16 is a portion which performs the dividing process of dividing the first web M5 which separates from the mesh belt 151. The subdividing section 16 includes a propeller 161 supported to be capable of rotating and a housing section 162 housing the propeller 161. It is possible to divide the first web M5 using the propeller 161 which rotates. The first web M5 which is divided becomes subdivided matter M6. The subdivided matter M6 falls inside the housing section 162.

The housing section 162 is connected to the humidifying section 233. The humidifying section 233 is configured by a vaporizing humidifier similar to the humidifying section 231. Accordingly, the humidified air is supplied into the housing section 162. It is also possible to suppress the adherence of the subdivided matter M6 to the inner walls of the propeller 161 and the housing section 162 caused by static electricity using the humidified air.

The mixing section 17 is disposed downstream of the subdividing section 16. The mixing section 17 is a portion which performs the mixing process of mixing the subdivided matter M6 and a resin P1. The mixing section 17 includes a resin supply section 171, a tube 172, and the blower 173.

The tube 172 connects the housing section 162 of the subdividing section 16 and a housing 3 of the dispersing section 18 to each other and is a flow path through which a mixture M7 of the subdivided matter M6 and the resin P1 pass.

The resin supply section 171 is connected to the middle of the tube 172. The resin supply section 171 includes a screw feeder 174. The screw feeder 174 is capable of supplying the resin P1 to the tube 172 as a powder or as granules through rotational driving. The resin P1 supplied to the tube 172 is mixed with the subdivided matter M6 to form the mixture M7.

The resin P1 bonds the fibers to each other in the subsequent process. For example, it is possible to use a thermoplastic resin, a curable resin, or the like for the resin P1, and it is preferable to use a thermoplastic resin. Examples of the thermoplastic resin include polyolefins such as AS resin, ABS resin, polyethylene, polypropylene, ethylene-vinyl acetate copolymer (EVA), acrylic resins such as modified polyolefin and polymethyl methacrylate, polyesters such as polyvinyl chloride, polystyrene, polyethylene terephthalate, and polybutylene terephthalate, polyamides (nylons) such as nylon 6, nylon 46, nylon 66, nylon 610, nylon 612, nylon 11, nylon 12, nylon 6-12, and nylon 6-66, liquid crystal polymers such as polyphenylene ether, polyacetal, polyether, polyphenylene oxide, polyether ether ketone, polycarbonate, polyphenylene sulfide, thermoplastic polyimide, polyetherimide, and aromatic polyester, various thermoplastic elastomers such as styrene-based elastomers, polyolefin-based elastomers, polyvinyl chloride-based elastomers, polyurethane-based elastomers, polyester-based elastomers, polyamide-based elastomers, polybutadiene-based elastomers, trans polyisoprene-based elastomers, fluoro rubber-based elastomers, and chlorinated polyethylene-based elastomers, and it is possible to use one kind or two or more kinds selected from these in combination. It is preferable to use polyester or a resin containing polyester as the thermoplastic resin.

For example, in addition to the resin P1, the resin supplied from the resin supply section 171 may contain a colorant for coloring the fibers, an agglomeration inhibitor for suppressing agglomeration of the fibers and agglomeration of the resin P1, a flame retardant for rendering the fibers and the like less susceptible to burning, a paper strengthening agent for increasing the paper strength of the sheet S, and the like. Alternatively, a composite including these in the resin P1 in advance may be supplied from the resin supply section 171.

The blower 173 may be provided in the middle of the tube 172 downstream of the resin supply section 171. The subdivided matter M6 and the resin P1 are mixed together by the action of a rotating portion such as blades included in the blower 173. The blower 173 is capable of generating an air current heading toward the dispersing section 18. It is possible to agitate the subdivided matter M6 and the resin P1 together inside the tube 172 using the air current. Accordingly, it is possible to cause the mixture M7 to flow into the dispersing section 18 in a state in which the subdivided matter M6 and the resin P1 are uniformly dispersed. The subdivided matter M6 inside the mixture M7 are untangled in the process of passing through the inside of the tube 172 to form a finer fiber shape.

The dispersing section 18 performs the dispersing process of untangling the material containing the fibers, that is, the fibers entangled with each other in the mixture M7 and disperses the result in a gas. A detailed description will be given later of the configuration of the dispersing section 18. The mixture M7 dispersed in the gas by the dispersing section 18 falls and heads toward the second web forming section 19 positioned under the dispersing section 18.

The second web forming section 19 is a portion which performs the second web forming process of forming a second web M8 from the mixture M7. The second web forming section 19 includes a mesh belt 191, stretch rollers 192, and a suction section 193.

The mesh belt 191 is an endless belt and the mixture M7 accumulates thereon. The mesh belt 191 is wrapped around the four stretch rollers 192. The mixture M7 on the mesh belt 191 is transported downstream by the rotational driving of the stretch rollers 192.

Most of the mixture M7 on the mesh belt 191 is of a size greater than or equal to the aperture of the mesh belt 191. Accordingly, the mixture M7 is restricted from passing through the mesh belt 191, and thus, is capable of accumulating on the mesh belt 191. Since the mixture M7 is transported downstream together with the mesh belt 191 while accumulating on the mesh belt 191, the mixture M7 is formed as the layer-shaped second web M8.

The suction section 193 is a suction mechanism which suctions the air from below the mesh belt 191. Accordingly, it is possible to suction the mixture M7 on the mesh belt 191, and thus, it is possible to accumulate the mixture M7 on the mesh belt 191.

A tube 246 is connected to the suction section 193. The blower 263 is installed in the middle of the tube 246. It is possible to generate an suction force in the suction section 193 using the operation of the blower 263.

The humidifying section 236 is disposed downstream of the dispersing section 18. The humidifying section 236 is configured by a vaporizing humidifier similar to the humidifying section 235. Accordingly, it is possible to supply water content to the second web M8, and thus, the water content amount of the second web M8 is adjusted. According to the adjustment, it is possible to suppress the adherence of the second web M8 to the mesh belt 191 caused by static electricity. Accordingly, the second web M8 is easily peeled from the mesh belt 191 at a position at which the mesh belt 191 doubled back at the stretch roller 192.

It is preferable that the total water content amount added in the humidifying section 231 to the humidifying section 236 be greater than or equal to 0.5 parts by mass and less than or equal to 20 parts by mass to 100 parts by mass of the pre-humidified material, for example.

The sheet shaping section 20 is disposed downstream of the second web forming section 19. The sheet shaping section 20 is a portion which performs the sheet shaping process of shaping the sheet S from the second web M8. The sheet shaping section 20 includes a pressurizing section 201 and a heating section 202.

The pressurizing section 201 includes a pair of calender rollers 203 and is capable of pressurizing the second web M8 between the calender rollers 203 without heating the second web M8. Accordingly, the density of the second web M8 is heightened. It is preferable that the degree of heating at this time be a degree to which the resin P1 is not melted, for example. The second web M8 is transported toward the heating section 202. One of the calender rollers 203 in the pair is a main drive roller which is driven by the operation a motor (not illustrated) and the other is a follower roller.

The heating section 202 includes a pair of heating rollers 204 and is capable of pressurizing the second web M8 between the heating rollers 204 while heating the second web M8. According to the heating and pressurizing, the resin P1 melts and the fibers are bonded to each other via the melted resin P1 inside the second web M8. Accordingly, the sheet S is formed. The sheet S is transported toward the cutting section 21. One of the heating rollers 204 in the pair is a main drive roller which is driven by the operation a motor (not illustrated) and the other is a follower roller.

The cutting section 21 is disposed downstream of the sheet shaping section 20. The cutting section 21 is a portion which performs the cutting process of cutting the sheet S. The cutting section 21 includes a first cutter 211 and a second cutter 212.

The first cutter 211 cuts the sheet S in a direction intersecting, in particular, orthogonally intersecting the transport direction of the sheet S.

The second cutter 212 cuts the sheet S in a direction parallel to the transport direction of the sheet S downstream of the first cutter 211. This cutting removes the end portions on both sides of the sheet S, that is, removes unnecessary portions of the end portions in the +y-axis direction and the −y-axis direction to straighten the width of the sheet S and the portions which are cut and removed are referred to as so-called "offcuts".

The sheet S of a desired shape and size may be obtained through the cutting of the first cutter 211 and the second cutter 212. The sheet S is transported further downstream and is deposited in the stock section 22.

The parts provided in the sheet manufacturing apparatus 100 are electrically connected to the control section 28. The operations of the parts are controlled by the control section 28.

The control section 28 includes a CPU (central processing unit) 281 and a memory section 282. The CPU 281 is capable of performing various determinations, various operations, and the like, for example.

The memory section 282 stores various programs such as a program of manufacturing the sheet S, various calibration curves, tables, and the like, for example.

The control section 28 may be embedded in the sheet manufacturing apparatus 100 and may be provided in an external device such as an external computer. There is a case in which communication with the external device is performed with the sheet manufacturing apparatus 100 via a cable or the like, for example, a case in which wireless communication is performed, a case in which a network such as the Internet, for example, is connected via the sheet manufacturing apparatus 100, and the like.

The CPU 281 and the memory section 282 may be integrated and be configured as a single unit, for example, the CPU 281 may be embedded in the sheet manufacturing apparatus 100 and the memory section 282 may be embedded in an external device such as an external computer, and the memory section 282 may be embedded in the sheet manufacturing apparatus 100 and the CPU 281 may be provided in an external device such as an external computer.

Next, a description will be given of the dispersing section 18.

As illustrated in FIGS. 2 and 3, the dispersing section 18 includes the housing 3, a storage section 4 positioned inside the housing 3, a supply section 5 which supplies the mixture M7 to the storage section 4, and a rotating body 6 provided inside the storage section 4, in which the storage section 4 disperses the stored mixture M7.

The housing 3 includes a tubular housing main body 31. The housing main body 31 includes four side walls 311. The housing main body 31 houses the storage section 4 in a space S1 surrounded by the side walls 311 and covers a portion between the storage section 4 and the mesh belt 191.

The housing main body 31 includes a bottom-side opening 312 facing the mesh belt 191 and a top-side opening 313 positioned on the opposite side. The bottom-side opening (a first opening) 312 is a release port which releases the mixture M7 dispersed from the storage section 4. The top-side opening 313 (a second opening) is covered by a top plate 41 of the storage section 4.

A pair of sealing rollers 7 is provided downstream of the bottom-side opening 312. The sealing rollers 7 are disposed to interpose the mesh belt 191. A seal member 8 which seals the space between the mesh belt 191 and the housing main body 31 is provided at the edge portions of the opening of the bottom-side opening 312 and at portions in which the sealing rollers 7 are not provided. It is possible for the air to flow in from a plurality of communicating ports 412 as described later without impeding the suction force of the suction section 193 using the sealing rollers 7 and the seal member 8. Since a little pressure is applied to the second web M8 by the sealing rollers 7, it is possible to prevent the second web M8 from being disturbed.

The dispersing section 18 includes the housing 3 which covers the space S1 which is a portion between the storage section 4 and the mesh belt 191 and the bottom-side opening 312 is provided in the housing 3 at a position facing the mesh belt 191. Accordingly, it is possible to effectively form the air current heading toward the bottom side inside the space S1 using the suction force of the suction section 193. Accordingly, it is possible to promote the accumulation of the mixture M7 dispersed from the storage section 4 onto the mesh belt 191.

As illustrated in FIG. 1, the humidifying section 234 is connected to the housing 3. The humidifying section 234 is configured by a vaporizing humidifier similar to the humidifying section 231. Accordingly, the humidified air is supplied into the housing 3. It is possible to humidify the inside of the housing 3 using the humidified air, and thus, it is possible to suppress the adherence of the dispersed mixture M7 to the inner walls of the housing 3 caused by static electricity.

The storage section 4 includes the top plate 41 blocking the top-side opening 313 of the housing 3, a pair of side walls 42 installed on the bottom side of the top plate 41, and a porous screen 43 which is a screen including a plurality of openings.

The top plate 41 includes a supply port 411 and the communicating ports 412 (described later) provided to penetrate the top plate 41 in the thickness direction. The supply port 411 communicates with the supply section 5 and is a portion through which the mixture M7 passes. The supply port 411 has a longitudinal shape extending in the y-axis directions and is provided approximately at the middle portion of the top plate 41 in the x-axis directions. The pair of side walls 42 has a longitudinal shape extending in the y-axis directions and is disposed on the bottom surface of the top plate 41 such that the side walls 42 face each other via the supply port 411.

The porous screen 43 has a half-cylindrical shape extending in the y-axis directions and protruding toward the −z-axis direction. In other words, the porous screen 43 is an arc shape at any position in the y-axis directions in a cross-sectional view with the y-axis as a normal line. Accordingly, the mixture M7 is capable of smoothly moving inside the storage section 4 and it is possible to perform the agitation well. The porous screen 43 is joined to each of the side walls 42 and a space partitioned by the porous screen 43, each of the side walls 42, and the top plate 41 functions as a storage space S2 which stores the mixture M7.

In the storage section 4, the +y-axis side and the −y-axis side of the storage space S2 are blocked by wall portions (not illustrated). The wall portions support the rotating body 6 (described later) such that the rotating body 6 may rotate.

It is possible to use a mesh body or a plate having multiple through holes for the porous screen 43, for example. Accordingly, the mixture M7 inside the storage section 4 is released and dispersed to the outside of the storage space S2 via the porous screen 43. It is possible to preferentially disperse the mixture M7 having a desires fiber length to accumulate on the mesh belt 191 by setting the aperture size and the through hole size of the porous screen 43 as appropriate.

In the storage section 4, the top plate 41 and the side walls 42 function as a holding portion 40 which holds the porous screen 43. As described later, it is possible to directly introduce air into the storage section 4 without the air entering via the porous screen 43 due to the communicating ports 412 being provided in the holding portion 40.

The supply section 5 is a port which is installed in the top of the top plate 41. The supply section 5 includes a port main body 51 and a connecting portion 52 provided on the port main body 51.

The port main body 51 has the shape of a box including a rectangular opening 511 on the bottom side. The opening 511 has a longitudinal rectangular shape large enough to sufficiently contain the supply port 411 of the top plate 41. The port main body 51 is installed on the top portion of the top plate 41 to communicate with the supply port 411 of the top plate 41 via the opening 511. Accordingly, it is possible to supply the mixture M7 into the storage section 4 via the supply section 5.

As illustrated in FIG. 2, the port main body 51 forms a substantially triangular shape when viewed from the x-axis directions. Therefore, when viewed in cross-section with the z-axis as the normal line, the port main body 51 widens toward the bottom side (the −z-axis direction). In other words, the port main body 51 has an inner cavity area which gradually increases toward the storage section 4.

The connecting portion 52 is provided on the top portion of a side wall 512 on the −x-axis side of the port main body 51. The connecting portion 52 is a portion which is formed to protrude in a cylindrical shape in the −x-axis direction and the tube 172 down which the mixture M7 flows is connected to the connecting portion 52.

The mixture M7 which flows down the tube 172 first flows into the port main body 51 via the connecting portion 52. When the mixture M7 flows into the port main body 51, the mixture M7 either collides with a side wall 513 facing the side wall 512 or is transported to the vicinity of the side wall 513 by the air current. At this time, the mixture M7 is untangled to an extent and heads downward. Accordingly, even if clumps form in the mixture M7, it is possible to prevent the mixture M7 from being supplied into the storage section 4 in this state. The mixture M7 is supplied to the storage section 4 via the opening 511 and the supply port 411.

As illustrated in FIG. 3, when the mixture M7 flows into the storage section 4, as described earlier, since the mixture M7 flows downward along the side wall 513, the mixture M7 flows into the storage section 4 closer to the x-axis side than a rotational axis O. As described later, since the rotating body 6 is configured to rotate counterclockwise as viewed from the +y-axis side, the mixture M7 which flows into the storage section 4 rides the air current along the rotational direction of the rotating body 6 from this state. In other words, the supply section 5 supplied the mixture M7 which is a material along the rotational direction of the rotating body 6. Accordingly, it is possible to reduce retention of the mixture M7 in the storage section 4 and to reduce climbing up of the mixture M7 on the supply section 5 side, and it is possible to smoothly untangle the mixture M7 inside the storage section 4.

As illustrated in FIG. 9, the supply section 5 is straight and cylindrical and is connected closer to the +x-axis side than the rotational axis O. Even in this modification example, similar effects may be obtained to those described above.

The rotating body 6 includes a function of promoting the dispersion of the mixture M7, which is supplied into the storage section 4, from the porous screen 43 while agitating and untangling the mixture M7 by rotating inside the storage section 4. The rotating body 6 includes four blades 61. The blades 61 are configured by long plates extending in the y-axis directions. The end portion on one long side of each of the blades 61 is joined to the other blades 61 and the rotating body 6 rotates using the joined portions as a rotational center, that is, the rotational axis O. In the present embodiment, the rotating body 6 is cross-shaped in cross-section using the rotational axis O as a normal line. In other words, the blades 61 are joined at an equal interval in the rotational direction.

The rotating body 6 is joined to a rotational drive source (not illustrated) and the operations of the rotational drive source are controlled by the control section 28 illustrated in FIG. 1. In the present embodiment, the rotating body 6 rotates counterclockwise as viewed from the +y-axis side.

According to the rotation of the rotating body 6, the blades 61 push a suitable about of the mixture M7 inside the storage section 4 against the porous screen 43 while agitating and untangling the mixture. Accordingly, it is possible to disperse the mixture M7 without gaps from the entire region of the porous screen 43 while preventing the mixture M7 from clogging the porous screen 43.

The rotating body 6 rotates in which the blades 61 are separated from the side walls 42 and the porous screen 43. Accordingly, it is possible to prevent an excessive pressure from being applied to the mixture M7 between the blades 61 and the porous screen 43 and it is possible to more favorably perform the dispersion.

In the present embodiment, although a description is given of a case in which four of the blades 61 are provided, the present disclosure is not limited thereto, and 1 to 3 or greater than or equal to 4 may be provided, for example. Although a description is given of a case in which the blades 61 have a flat plate shape, the present disclosure is not limited thereto, and the blades 61 may have a shape which is curved in one direction when viewed in cross-section using the rotational axis O as a normal line, for example.

Here, the communicating ports 412 which cause the inside and the outside of the storage section 4 to communicate with each other are provided in the top plate 41 of the storage section 4. The communicating ports 412 include a function of supplying air to the inside of the storage section 4. The communicating ports 412 are positioned closer to the +x-axis side than the supply port 411 and closer to the −x-axis side than the side wall 42 of the +x-axis side. Therefore, it is possible to supply air to the inside of the storage section 4, that is, to the storage space S2. When the rotating body 6 is configured to rotate counterclockwise as viewed from the +y-axis side, it is preferable that the communicating ports 412 be provided closer to the −x-axis side than the supply port 411 and be positioned closer to the +x-axis side than the side wall 42 of the −x-axis side. However, the communicating ports 412 may be present closer to the +x-axis side than the supply port 411.

When the suction section 193 operates, the air of the outside of the storage section 4 flows into the inside of the storage section 4 via the communicating ports 412 due to the air of the inside the housing 3, that is, the air of the space S1 is suctioned downward and the space S1 assumes a negative pressure. In other words, it is possible to cause the air to flow into the storage space S2. The air which flows in is capable of flowing into the space S1 via the porous screen 43. In this manner, due to the communicating ports 412 being provided, it is possible to form an air current which passes through the communicating ports 412, the storage space S2, and the space S1 as illustrated by arrows in FIG. 3. Accordingly, it is possible to favorably perform the untangling of the mixture M7 in the storage space S2 and the dispersion of the mixture M7 via the porous screen 43. As a result, it is possible to favorably perform the accumulation of the mixture M7, it is possible to form the second web M8 in which the thickness is as uniform as possible, and thus, it is possible to form the sheet S in which the thickness is as uniform as possible.

The communicating ports 412 are provided closer to the +x-axis side than the rotational axis O. In other words, the communicating ports 412 are provided on a more distal side than the supply port 411 with respect to the rotational axis O which is the rotational center of the rotating body 6 in plan view of the dispersing section 18. Therefore, the air which flows into the storage section 4 via the communicating ports 412 rides the air current along the rotational direction of the rotating body 6 from this state. In other words, the communicating ports 412 supply the air along the rotational direction of the rotating body 6. Accordingly, it is possible to prevent the retention of the mixture M7 in the storage section 4 and to smoothly untangle the mixture M7 inside the storage section 4.

The air supplied from the communicating ports 412 is introduced by the suction of the suction section 193. In other words, the communicating ports 412 are configured to supply air into the storage section 4 using the suction force of the suction section 193. Accordingly, it is possible to omit the separate provision of an air blowing source or the like which supplies the air from the communicating ports 412 and it is possible to obtain a simplification of the apparatus configuration.

As illustrated in FIG. 4, each of the communicating ports 412 is circular. Accordingly, it is possible to reduce the opening area of each of the communicating ports 412 and it is possible to render the flow rate of the air passing through the communicating ports 412 comparatively fast. Accordingly, it is possible to more favorably perform the agitation inside the storage section 4. By modifying the opening area of each of the communicating ports 412 as appropriate, it is possible to adjust the air current in the inner portion of the storage section 4. In particular, it is possible to easily change or adjust the thickness of the second web M8 in the y-axis directions by adjusting the air current in the y-axis directions. A portion of the openings of each of the communicating ports 412 may be blocked.

A plurality, in the illustrated configuration, 11 of the communicating ports 412 are provided at an equal interval along the extending directions of the rotational axis O of the rotating body 6. Accordingly, it is possible to exhibit the previously-described effect at any position in the y-axis directions inside the storage section 4.

As described above, the fibrous material accumulating apparatus 10 is provided with the dispersing section 18 which untangles and disperses the mixture M7 which is a material containing fibers, the mesh belt 191 which accumulates the dispersed mixture M7, and the suction section 193 provided on the opposite side of the mesh belt 191 from the dispersing section 18. The dispersing section 18 includes the storage section 4 including the porous screen 43, the supply section 5 which supplies the mixture M7 to the storage section 4, and the rotating body 6 which is provided inside the storage section 4 and agitates the mixture M7 supplied into the storage section 4 by rotating. The storage section 4 includes the communicating ports 412 which cause the inside and the outside of the storage section 4 to communicate with each other and are provided at different positions from the porous screen 43.

The suction amount may be adjusted by blocking a portion of the communicating ports 412 to adjust the dispersion state of the inner portion of the storage section 4. Accordingly, it is possible to adjust the uniformity of the accumulation of the mixture M7.

Accordingly, it is possible to form an air current which passes through the communicating ports 412, the storage space S2, and the space S1 as illustrated by the arrows in FIG. 3. Accordingly, it is possible to favorably perform the untangling of the mixture M7 in the storage space S2 and the dispersion of the mixture M7 via the porous screen 43. As a result, it is possible to favorably perform the accumulation of the mixture M7, it is possible to form the second web M8 in which the thickness is as uniform as possible, and thus, it is possible to form the sheet S in which the thickness is as uniform as possible.

The sheet manufacturing apparatus 100 is provided with the fibrous material accumulating apparatus 10 and the sheet shaping section 20 which shapes the second web M8 formed by the fibrous material accumulating apparatus 10 into a sheet shape. Accordingly, it is possible to manufacture the sheet S while benefiting from the previously-described merits.

Second Embodiment

Figure 5:
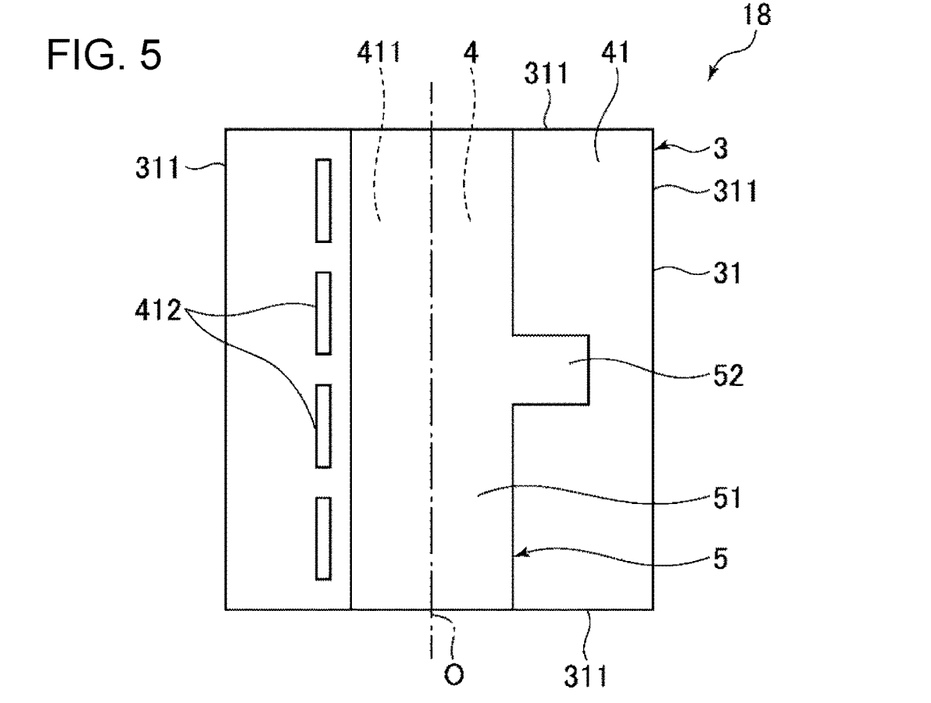
FIG. 5 is a view of a dispersing section provided in a second embodiment of a fibrous material accumulating apparatus of the present disclosure.

FIG. 5 is a view of a dispersing section provided in a second embodiment of a fibrous material accumulating apparatus of the present disclosure.

Hereinafter, a description will be given of the second embodiment of the fibrous material accumulating apparatus and the sheet manufacturing apparatus of the present disclosure with reference to the drawings and the description will be given centered on the points which differ from the previously-described embodiment, omitting the description of items which are the same.

The present embodiment is the same as the first embodiment except that the shape and the number of the communicating ports are different.

As illustrated in FIG. 5, the communicating ports 412 have a longitudinal shape extending along the rotational axis O of the rotating body 6. In the present embodiment, four of the communicating ports 412 are provided. Even according to the present embodiment, it is possible to obtain similar effects to those of the first embodiment. It is possible to reduce the number of communicating ports 412 installed and it is possible to sufficiently increase the opening area, that is, the total opening area of the communicating ports 412. Accordingly, it is possible to more effectively reduce the air pressure difference between the inside and the outside of the housing 3 and it is possible to more smoothly form the air current. It is possible to adjust the air current in the inner portion of the storage section 4 by suitably setting the opening area of the communicating ports 412. In particular, it is possible to easily change or adjust the thickness of the second web M8 in the y-axis directions by adjusting the air current in the y-axis directions. A portion of the openings of each of the communicating ports 412 may be blocked.

Third Embodiment

Figure 6:
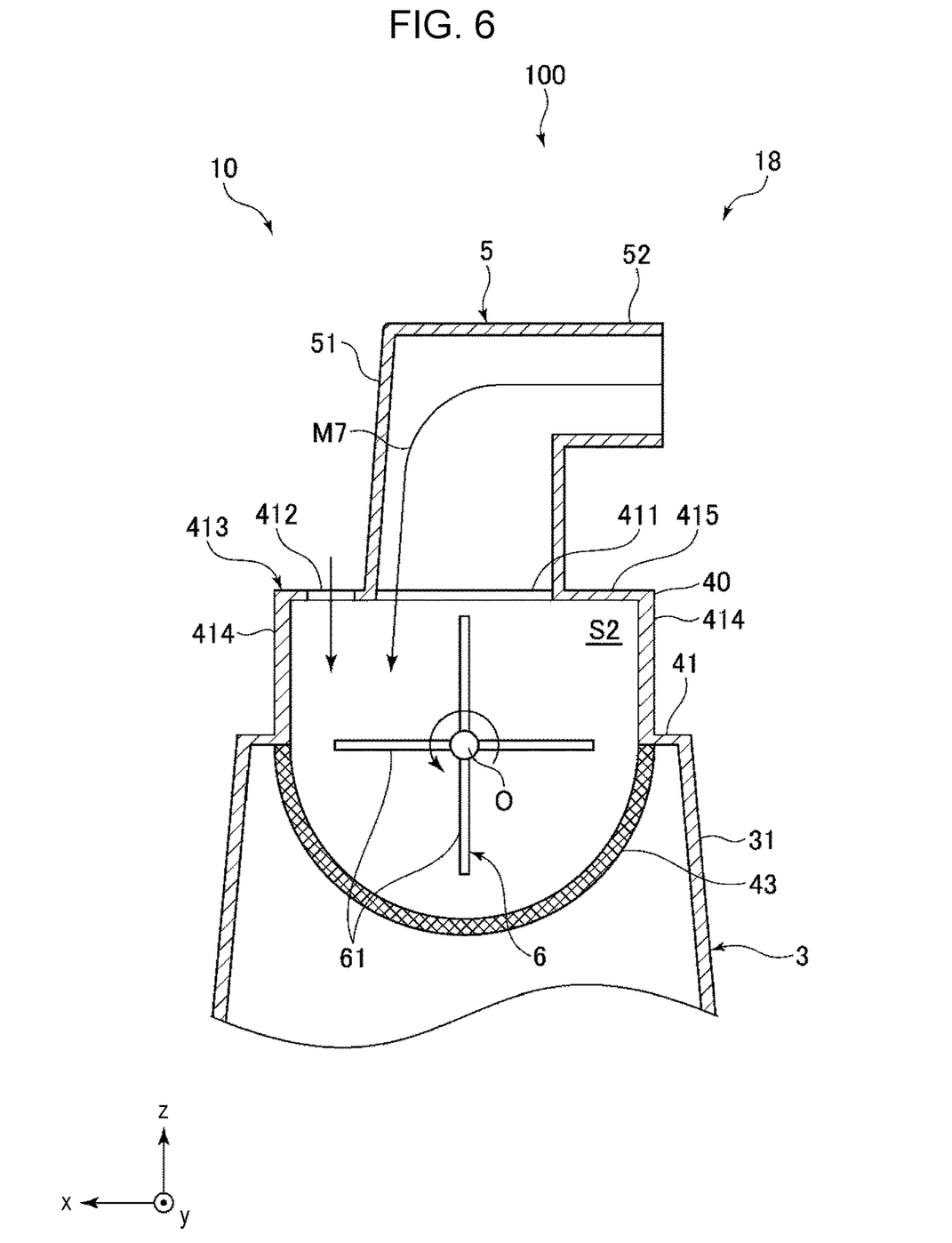
FIG. 6 is a sectional diagram of a dispersing section provided in a third embodiment of a fibrous material accumulating apparatus of the present disclosure.

FIG. 6 is a sectional diagram of a dispersing section provided in a third embodiment of a fibrous material accumulating apparatus of the present disclosure.

Hereinafter, a description will be given of the third embodiment of the fibrous material accumulating apparatus and the sheet manufacturing apparatus of the present disclosure with reference to the drawings and the description will be given centered on the points which differ from the previously-described embodiments, omitting the description of items which are the same.

The present embodiment is the same as the first embodiment except that the shape of the dispersing section and the installation positions of the communicating ports are different.

As illustrated in FIG. 6, the top plate 41 of the storage section 4 includes a hollow protruding portion 413 formed to protrude upward. The protruding portion 413 has a shape extending in the y-axis directions. The protruding portion 413 includes a pair of side walls 414 and a top plate 415.

The side walls 414 are disposed to face each other, separated in the x-axis directions, and are provided to stand up along the z-axis direction. The top plate 415 is connected to the end portion of the +z-axis side of the side walls 414. In the present embodiment, the supply port 411 is provided in the center portion of the top plate 415. The supply section 5 is provided on the top plate 415 to cover the supply port 411.

A space partitioned by the pair of side walls 414, the top plate 415, and the porous screen 43 is the storage space S2.

In the present embodiment, the communicating ports 412 are provided in the top plate 415. The communicating ports 412 are provided closer to the +x-axis side than the supply port 411. Therefore, the air which flows into the storage section 4 via the communicating ports 412 rides the air current along the rotational direction of the rotating body 6 from this state. In other words, the communicating ports 412 supply the air along the rotational direction of the rotating body 6. Accordingly, it is possible to prevent the retention of the mixture M7 in the storage section 4 and to smoothly untangle the mixture M7 inside the storage section 4 in the same manner as in the first embodiment. It is preferable that the communicating ports 412 be provided closer to the −x-axis side than the supply port 411 in a case in which the rotating body 6 rotates clockwise when viewed from the −y-axis direction side.

Fourth Embodiment

Figure 7:
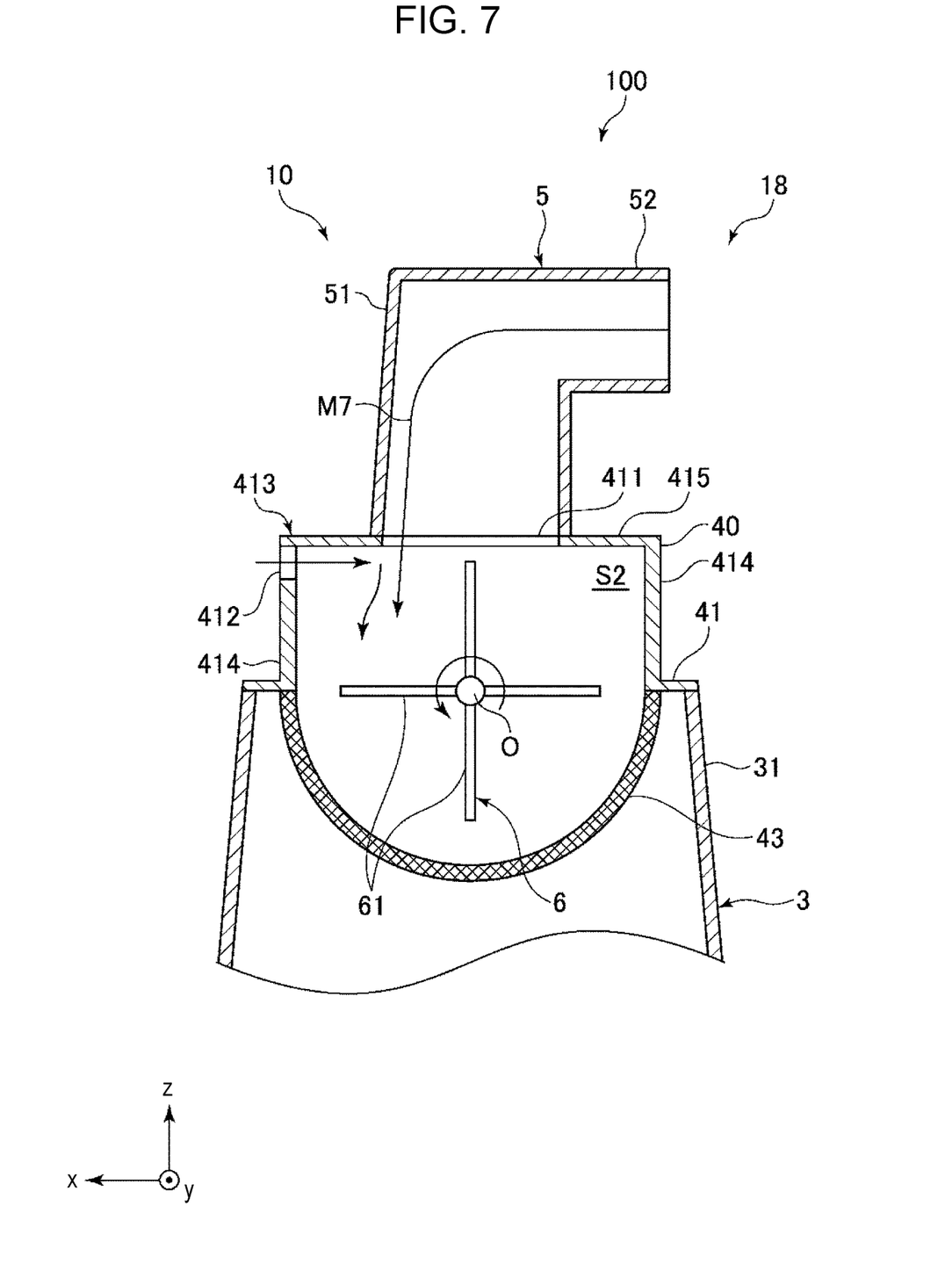
FIG. 7 is a sectional diagram of a dispersing section provided in a fourth embodiment of a fibrous material accumulating apparatus of the present disclosure.

FIG. 7 is a sectional diagram of a dispersing section provided in a fourth embodiment of a fibrous material accumulating apparatus of the present disclosure.

Hereinafter, a description will be given of the fourth embodiment of the fibrous material accumulating apparatus and the sheet manufacturing apparatus of the present disclosure with reference to the drawings and the description will be given centered on the points which differ from the previously-described embodiments, omitting the description of items which are the same.

The present embodiment is the same as the third embodiment except that the installation positions of the communicating ports are different.

As illustrated in FIG. 7, in the present embodiment, the communicating ports 412 are provided in the side wall 414 positioned on the +x-axis side. The communicating ports 412 are provided to be localized on the +z-axis side of the side wall 414. According to the present embodiment, the air flows into the storage space S2 from the +x-axis direction via the communicating ports 412. Accordingly, the air which flows in via the communicating ports 412 and the mixture M7 which flows in via the supply port 411 collide with each other and are agitated. The mixture M7 rides the air current along the rotational direction of the rotating body 6 in the agitated state. Accordingly, it is possible to more favorably untangle the mixture M7 inside the storage section 4. It is preferable that the communicating ports 412 be provided in the side wall 414 positioned on the −x-axis side in a case in which the rotating body 6 rotates clockwise when viewed from the −y-axis direction side.

Fifth Embodiment

Figure 8:
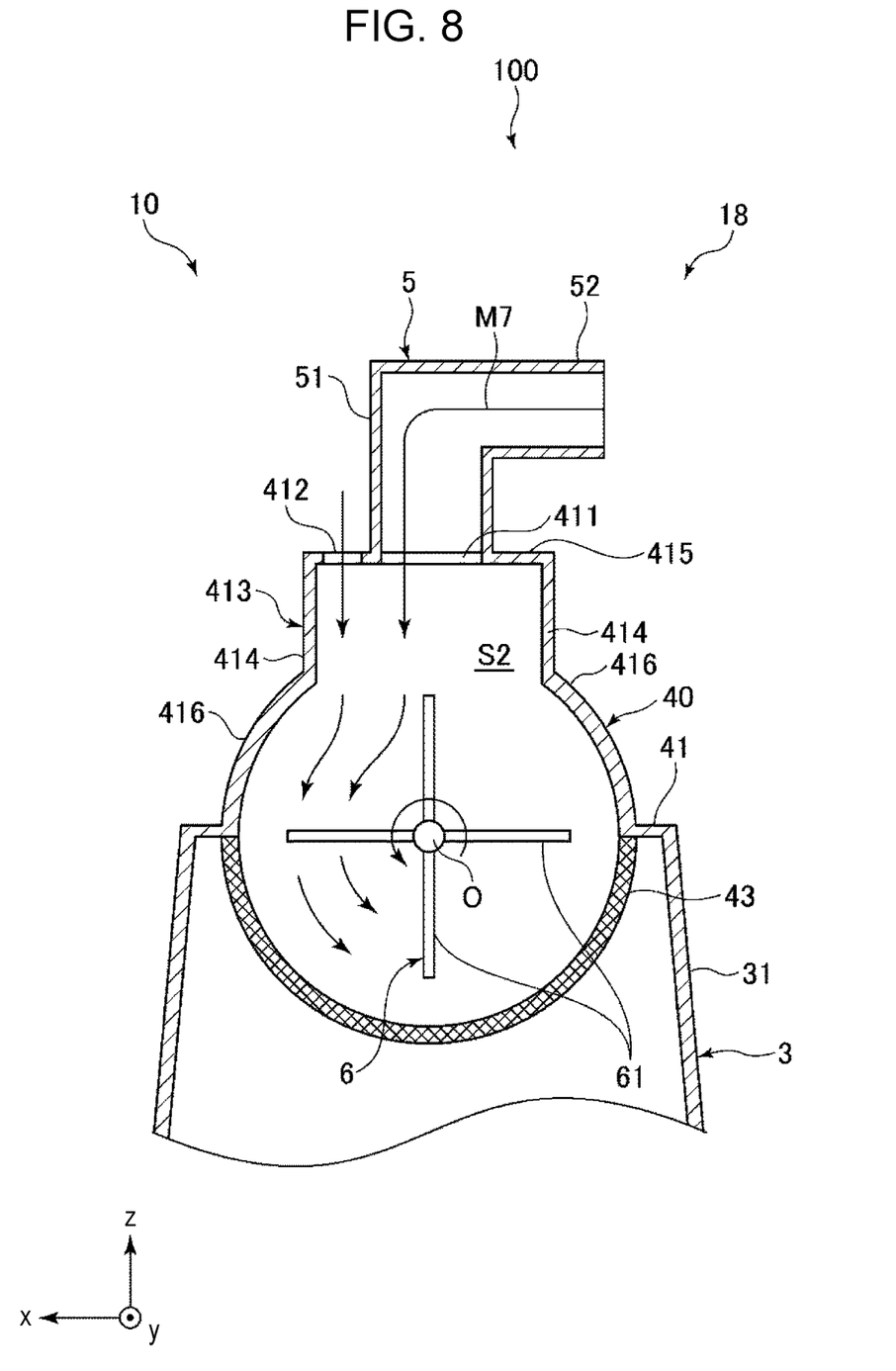
FIG. 8 is a sectional diagram of a dispersing section provided in a fifth embodiment of a fibrous material accumulating apparatus of the present disclosure.

FIG. 8 is a sectional diagram of a dispersing section provided in a fifth embodiment of a fibrous material accumulating apparatus of the present disclosure.

Hereinafter, a description will be given of the fifth embodiment of the fibrous material accumulating apparatus and the sheet manufacturing apparatus of the present disclosure with reference to the drawings and the description will be given centered on the points which differ from the previously-described embodiment, omitting the description of items which are the same.

The present embodiment is the same as the third embodiment except that the shape of the protruding portion is different.

As illustrated in FIG. 8, the protruding portion 413 of the present embodiment includes a pair of arc-shaped portions 416 between the top plate 41 and the pair of side walls 414. The arc-shaped portions 416 have a shape which is curved to protrude toward the outside. The curvature of the curve is the same as that of the porous screen 43 and the pair of arc-shaped portions 416 and the porous screen 43 are provided continuously when viewed in cross-section using the y-axis directions as a normal line.

Even according to the present embodiment, it is possible to obtain similar effects to those of the third embodiment. A greater portion of the air current rotates around the rotational axis O in the storage space S2 than in the third embodiment and it is possible to more favorable untangle the mixture M7.

Hereinabove, although a description is given of the fibrous material accumulating apparatus and the sheet manufacturing apparatus of the present disclosure with respect to the depicted embodiments, the present disclosure is not limited thereto, and it is possible to replace the parts which configure the fibrous material accumulating apparatus and the sheet manufacturing apparatus with parts of a predetermined configuration that may exhibit similar functions. A predetermined configuration object may be added.

The fibrous material accumulating apparatus and the sheet manufacturing apparatus of the present disclosure may be a combination of greater than or equal to two predetermined configurations or characteristics of the embodiments.

What is claimed is:

1. A fibrous material accumulating apparatus comprising:
   a dispersing section which disperses a material containing fibers;
   a belt which accumulates the dispersed material; and
   a suction section provided on a side of the belt opposite to the dispersing section, wherein
   the dispersing section includes
      a storage section including a screen,
      a supply section which supplies the material to the storage section, and
      a rotating body which is provided inside the storage section and agitates the material supplied into the storage section,
   the storage section includes a plurality of communicating ports which causes an inside and an outside of the storage section to communicate with each other and is provided at a different position from the screen,
   the plurality of communicating ports are aligned along an axis parallel to a rotational axis of the rotating body,
   the plurality of communicating ports are located above the rotating body in a first direction, and
   the plurality of communication ports are offset from the rotational axis on only one side of the rotational axis in a second direction perpendicular to the rotational axis and the first direction.

2. The fibrous material accumulating apparatus according to claim 1, wherein
   the plurality of communicating ports supplies air along a rotational direction of the rotating body.

3. The fibrous material accumulating apparatus according to claim 1, wherein air supplied from the plurality of communicating ports is introduced through suction of the suction section.

4. The fibrous material accumulating apparatus according to claim 1, wherein
the plurality of communicating ports is provided on a more distal side than the supply section with respect to a rotational center of the rotating body in plan view of the dispersing section.

5. The fibrous material accumulating apparatus according to claim 1, wherein
the supply section supplies the material along a rotational direction of the rotating body.

6. The fibrous material accumulating apparatus according to claim 1, wherein
the screen has an arc shape which protrudes toward the belt side.

7. The fibrous material accumulating apparatus according to claim 1, wherein
the rotating body rotates in a state of being separated from the screen.

8. The fibrous material accumulating apparatus according to claim 1, wherein
the dispersing section includes a housing which covers a portion between the storage section and the belt and which includes an opening at a position facing the belt.

9. The fibrous material accumulating apparatus according to claim 1, wherein
the storage section includes a holding member which holds the screen, and
the plurality of communicating ports is provided in the holding member.

10. The fibrous material accumulating apparatus according to claim 4, wherein
an outlet of the supply section overlaps the rotating body in the plan view of the dispersing section.

11. A sheet manufacturing apparatus comprising:
the fibrous material accumulating apparatus according to claim 1; and
a shaping section which shapes a web formed by the fibrous material accumulating apparatus into a sheet shape.

* * * * *